United States Patent
Kiel (12) United States Patent (10) Patent No.: US 6,722,890 B2
Kiel (45) Date of Patent: Apr. 20, 2004

(54) INTERACTIVE ASTRONOMICAL SYSTEM AND METHOD

(76) Inventor: Martin K. Kiel, 503 Bear Valley Rd., Aptos, CA (US) 95003

( * ) Notice: Subject to any disclaimer, the term of this patent is extended or adjusted under 35 U.S.C. 154(b) by 0 days.

(21) Appl. No.: 10/402,669

(22) Filed: Mar. 28, 2003

(65) Prior Publication Data

US 2003/0186205 A1 Oct. 2, 2003

Related U.S. Application Data (63) Continuation-in-part of application No. 10/374,465, filed on Feb. 24, 2003, which is a continuation-in-part of application No. 09/875,466, filed on Jun. 5, 2001, now Pat. No. 6,524,112.

(51) Int. Cl.[7] .............................................. G09B 27/06
(52) U.S. Cl. ...................................... 434/290; 434/291
(58) Field of Search ................................ 434/276, 284, 434/285, 290, 291, 287, 288; 40/1, 427

(56) References Cited

U.S. PATENT DOCUMENTS

| | | | | |
|---|---|---|---|---|
| 532,370 A | * | 1/1895 | Gibbs | 434/291 |
| 1,189,141 A | * | 6/1916 | Lanneau | 434/285 |
| 1,293,837 A | * | 2/1919 | McHenry | 434/290 |
| 2,050,351 A | * | 8/1936 | Martin | 434/290 |
| 3,107,441 A | * | 10/1963 | Scott | 434/291 |
| 3,521,384 A | * | 7/1970 | Holland | 434/291 |
| 5,931,678 A | * | 8/1999 | Atzaba | 434/291 |

* cited by examiner

*Primary Examiner*—Kien T. Nguyen
(74) *Attorney, Agent, or Firm*—Ryan A. Heck; Ian F. Burns & Associates (57) ABSTRACT

An interactive astronomical model includes a geocentric module, a heliocentric module, and a housing. The geocentric module has a central body configured to represent Earth. The heliocentric module has a central axis configured to represent the sun. A housing is used to couple both the geocentric module and the heliocentric module. The invention also includes a method for generating an interactive astronomical model comprising the steps of providing a geocentric module having a central body configured to represent Earth, providing a heliocentric module having a central axis configured to represent a sun; and coupling the geocentric module with the heliocentric module with a shared housing. A horizon apparatus is also disclosed.

39 Claims, 9 Drawing Sheets

ND METHOD

INTERACTIVE ASTRONOMICAL SYSTEM AND METHOD

CROSS REFERENCES TO RELATED APPLICATIONS

This application is a continuation-in-part application of U.S. application Ser. No. 10/374,465 filed Feb. 24, 2003, which is a continuation-in-part application of U.S. application Ser. NO. 09/875,466 filed Jun. 5, 2001, now U.S. Pat. No. 6,524,112.

BACKGROUND

The present invention relates to an interactive astronomical system and method. More particularly the present invention relates to an astronomical model, which represents the astronomy of the sky as viewed from the Earth and from space.

Astronomical models are commonly used as teaching tools to explain how the heavens take the shapes and forms associated with various celestial bodies. These celestial bodies include the moon, the sun, other planets in our solar systems, and the stars, galaxies, and constellations that make up the heavens. Astronomical models are used to help visualize the heavens around us.

Prior art astronomical models are either geocentric models or heliocentric models. Geocentric astronomical models refer to or relate to measuring from the Earth's center or appearing as if seen from it. In a geocentric model, the Earth is the central planetary body, and the moon, sun, planets, stars and galaxies rotate around the Earth. Heliocentric astronomical models refer to or relate to measuring from the sun's center or appearing as if seen from the sun's center. In a heliocentric model, the sun is the central planetary body and the planets of the solar system revolve about the sun.

For example, U.S. Pat. No. 3,107,441 describes a geocentric astronomical model. The geocentric view includes a simulated horizon, which permits a person to visualize any selected point on Earth and visually see the movements of simulated stars, sun, moon and planets relative to that point on Earth. Additionally, the geocentric astronomical model allows the viewer to visually see the changing movement of the orbit of a simulated satellite.

An example of heliocentric astronomical model is provided in the orrery of U.S. Pat. No. 3,733,720. The orrery provides a mechanical model, which demonstrates the movements of the planets around the sun. The mechanical model includes a central sun-carrying member, a plurality of annular planet carrying members, and a driving mechanism for driving the planets at different rotational speeds around the sun-carrying member.

The applicant has discovered that more educational benefits may be derived by combining the geocentric model and heliocentric model in one astronomical model. The applicant has further discovered various components that may be added to the astronomical model to allow users to learn various astronomical concepts, which may be challenging for some teachers to teach without physical demonstrations. Thus, the applicant has discovered a way to maximize the use of astronomical models as educational tools.

SUMMARY

Advantages

The various embodiments of the present invention may, but do not necessarily, achieve one or more of the following advantages:

the ability to provide an interactive astronomical model having a geocentric module and a heliocentric module, the ability to provide an interactive astronomical model having geocentric and heliocentric module that may be easy to assemble and that may be affordable, the ability to provide a relational astronomical model that permits the viewer to compare the differences between a heliocentric viewpoint and a geocentric viewpoint, the ability to provide a geocentric module and a heliocentric module in a single housing, the ability to provide heavenly bodies that may be movably coupled to at least one ring representing an orbit, and the ability to permit easy movement of heavenly bodies according to an astronomical chart.

These and other advantages of the present invention may be realized by reference to the remaining portions of the specification, claims, and abstract.

BRIEF DESCRIPTION

The present invention comprises an astronomical model that includes a geocentric module, a heliocentric module, and a housing. The geocentric module preferably has a central configured to represent Earth. The heliocentric module preferably has a central axis configured to represent the sun. A housing is preferably used to couple both the geocentric module and the heliocentric module. The geocentric module may include a plurality of first rings configured to surround the central body and configured to represent a plurality of geocentric orbits. Additionally, the geocentric module may include a plurality of first bodies that may be movably coupled to the plurality of first rings. The first rings may include at least one ecliptic ring, an equatorial ring, a plurality of meridian rings, and a plurality of rings of declination. The heliocentric module may include a plurality of second rings, which surround the central axis of the heliocentric module and are configured to represent a plurality of heliocentric orbits. Additionally, the heliocentric module may include at least one heavenly body that may be movably coupled to one of the plurality of second rings, and the heavenly body may represent a planet in the solar system. Preferably, the housing is embodied in a stand, which couples the geocentric module and the heliocentric module.

The above description sets forth, rather broadly, the more important features of the present invention so that the detailed description of the preferred embodiment that follows may be better understood and contributions of the present invention to the art may be better appreciated. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the modules set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

FIG. 5 is substantially a perspective view of a housing including the heliocentric component.

FIG. 7a is substantially an exploded view of a heavenly body that may be configured to be moveably attached to a ring of the geocentric or heliocentric module.

FIG. 7b is substantially a front elevational view of the heavenly body shown in FIG. 7a.

FIG. 7c is substantially an exploded view of another embodiment of a heavenly body that may be configured to be moveably attached to a ring of the geocentric or heliocentric module.

FIG. 7d is substantially a front elevational view of the heavenly body shown in FIG. 7c.

DESCRIPTION OF THE PREFERRED EMBODIMENTS

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

The present invention comprises an astronomical model, which is generally referred to with reference number 8. Various embodiments of the astronomical model are learning tools that describe various astronomical concepts. These astronomical concepts include demonstrating a coordinate system for locating stars, locating various constellations, understanding the path of the stars as they cross the sky and the Earth rotates, understanding the path of the sun across the sky and the analemma, understanding the path of the moon across the sky, understanding the phases of the moon, understanding the solar and lunar eclipses, understanding the sunrise and sunset, understanding the moonrise and moonset, providing a three dimensional visualization of the relationship between the equatorial plane, the ecliptic plane, zodiac constellations, the four seasons, understanding the precession of the equinoxes and the changing North Star, understanding the horizon, understanding the different perspective of the celestial sphere from the North and South Hemispheres, understanding solar time and sidereal time, and understanding the orbits of the naked eye planets and their changing positions on the celestial sphere.

Figure 1:
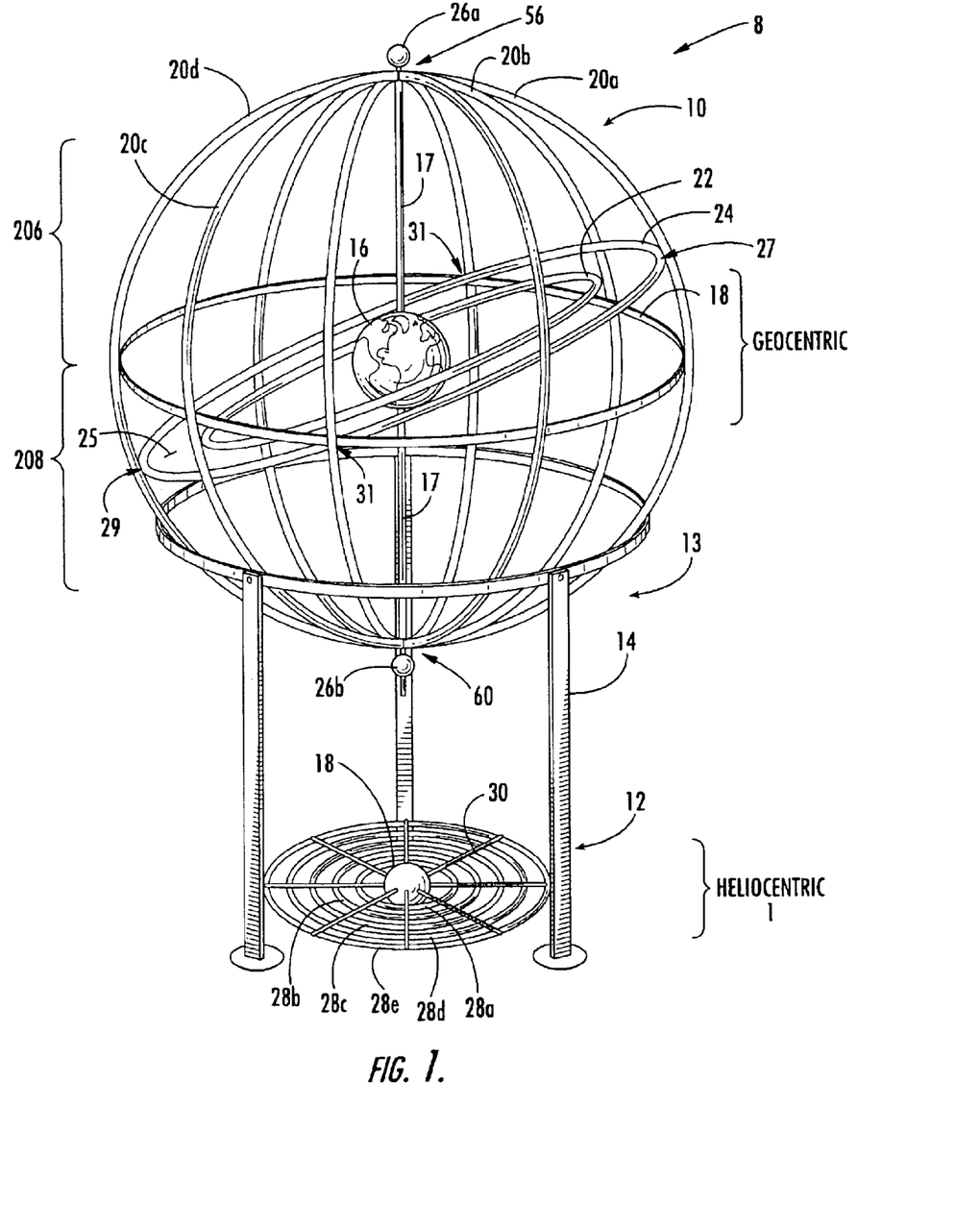
FIG. 1 is substantially a perspective view of an astronomical model having a geocentric module and a heliocentric module, which are combined in one housing.

Referring to FIG. 1, the preferred embodiment comprises a geocentric module 10 and a heliocentric module 12. The geocentric module 10 and the heliocentric module 12 are preferably coupled together by legs 14, which are part of a housing 13 that holds both modules together. The geocentric module 10 is preferably removeably coupled to the housing 13 to allow a user to view the geocentric module 10 from a variety of angles. The term "housing" as used in this patent application includes a frame that holds both the geocentric module 10 and the heliocentric module 12 together.

The geocentric module 10 preferably uses the Earth 16 as the central body that provides a reference for the viewer of the heavens. In the embodiments shown in FIGS. 1 and 9, the Earth 16 is preferably coupled to a rod 17, which may be used to represent the Earth's axis of rotation. The rod ends 17a and 17b are preferably coupled to connectors 25a and 25b, respectively. Each of the connectors 25a and 25b is preferably made of wood having opposing cavities at each end (27a and 27b and 29a and 29b). Of course, other materials known in the art may be used. Cavities 27a and 29a preferably receive the rod end 17a and 17b, respectively. Cavities 27b and 29b preferably receive fasteners 26a and 26b, respectively. A user may grasp connectors 25a or 25b to rotate the rod 17 and the Earth 16 around an axis parallel to the rod 17, which simulates the Earth rotating on its axis.

Geocentric Rings

With continued reference to FIG. 1, the geocentric module 10 preferably comprises a plurality of rings that may include a celestial equator ring 18, a plurality of meridians 20, an inner ecliptic ring 22, and an outer ecliptic ring 24. Preferably, the rings are made of cost-effective pliable plastic material that can be bent and that can also be fastened to other materials. It shall be appreciated by those skilled in the art that the diameter of the rings may vary depending on the size of the geocentric module. The inner ecliptic ring 22 preferably represents the path the moon takes when it revolves around the Earth 16. The outer ecliptic ring 24 preferably represents the path of the sun and the path of the planets within the Earth's solar system. Both the inner ecliptic ring 22 and the outer ecliptic ring 24 are preferably at an angle of 23.5 degrees from the celestial equator ring 18. Both the inner ecliptic ring 22 and the outer ecliptic ring 24 preferably share a common ecliptic plane 25.

The inner ecliptic ring 22 is preferably positioned within the confines of the outer ecliptic ring 24 and coupled to the outer ecliptic ring 24. The outer ecliptic ring 24 is preferably coupled to the meridians 20. The celestial equator ring 18 is also preferably coupled to the meridians 20. The celestial equator ring 18 represents an outward extension of the Earth's equator (not shown).

Eight meridians 20 preferably divide the geocentric module into 8 separate sections. For illustrative purposes, this description of the invention focuses on the meridians labeled 20a, 20b, 20c and 20d. Each of the meridians 20a through 20d defines a semi-circular shape; Meridians 20a and 20d define a full circle; Meridians 20b and 20c define a full circle. By way of example and not of limitation, the combination of meridians 20a and 20d provide a meridian ring. The combination of the meridians 20 and the celestial equator ring 18 provides a framework for coupling galaxies, stars and constellations outside our solar system to the geocentric module 10. The meridians 20 are coupled to one another with fasteners 26a and 26b, which are located at the North Celestial Pole and South Celestial Pole, respectively.

Heliocentric Rings

The heliocentric module 12 preferably uses the sun 18 as the central body around which the solar system's planets revolve. The heliocentric module may include a plurality of heliocentric rings that represent the orbits of the planets visible from Earth that revolve around the sun. More particularly, the plurality of heliocentric rings 28a, 28b, 28c, 28d, and 28e may correspond to the orbital paths of planets such as Mercury, Venus, Earth, Mars, Jupiter and Saturn. It shall be appreciated by those skilled in the art of astronomy, that Mercury, Venus, Mars, Jupiter and Saturn are readily visible from Earth. In one embodiment, the heliocentric module 12 may include a plurality of wires 30 coupled to the legs of stand 14. Additionally, each of the plurality of wires 13 preferably extends through the sun 18. The heliocentric module is described in further detail below.

The Bodies of the Astronomical Model

Figure 2:
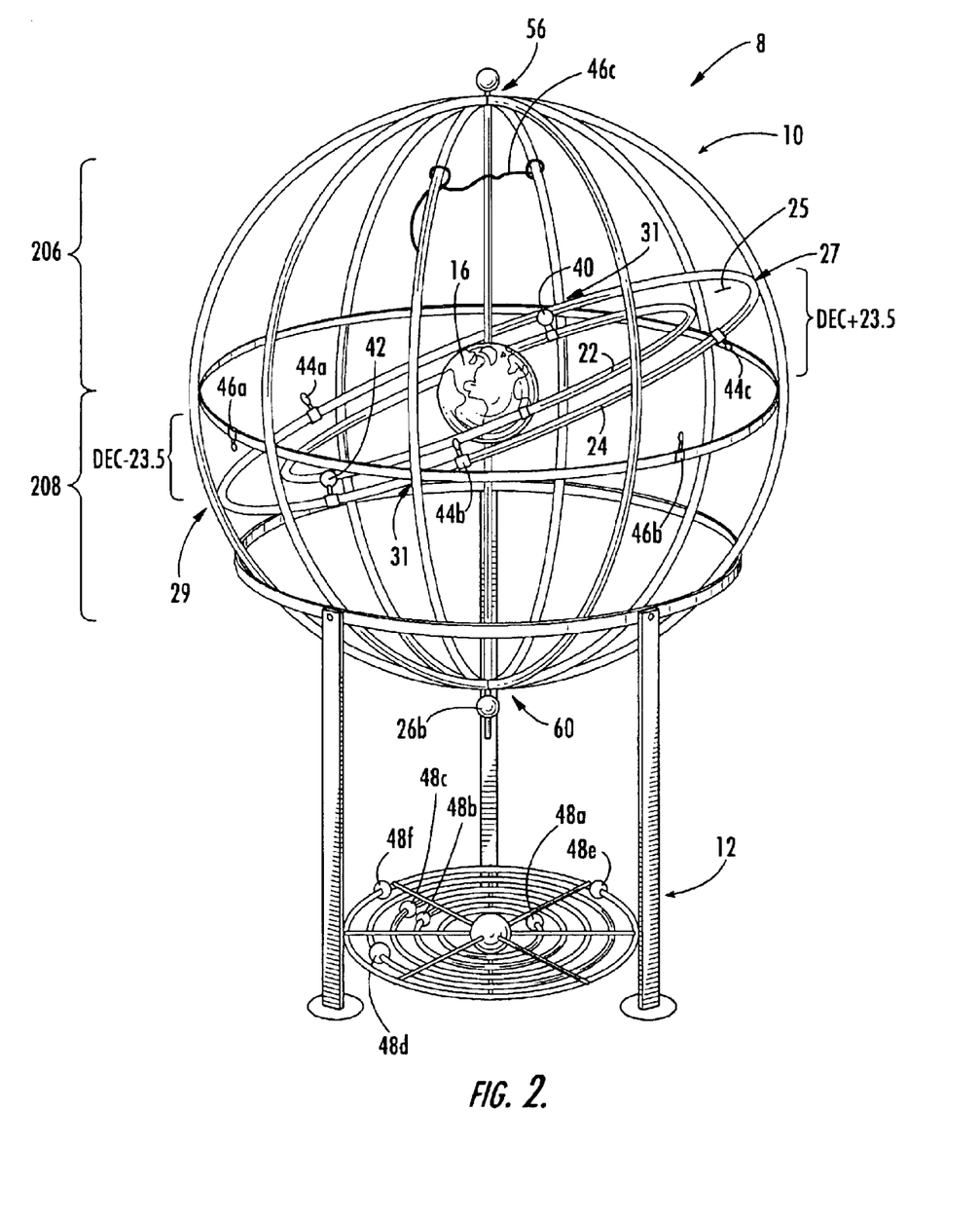
FIG. 2 is substantially a perspective view of FIG. 1 including a plurality of heavenly bodies, which may move along the geocentric module and the heliocentric module.

Referring to FIGS. 1 and 2, a plurality of heavenly bodies are preferably coupled to the rings of the astronomical model 8. More particularly, the heavenly bodies described by the astronomical model 8 may include the moon, the sun, the planets of the solar system, the stars, the galaxies, and the constellations of the heavens. It shall also be appreciated by those skilled in the art that the inner ecliptic ring 22 and outer ecliptic ring 24 are preferably at 23.5 degree angle from the celestial equator 18.

The geocentric module 10 preferably includes a moon 40 that is movably coupled to the inner ecliptic ring 22. Additionally, a sun 42 is movably coupled to the outer ecliptic ring 24. By way of example and not of limitation, a plurality of planets 44a, 44b and 44c from the solar system may also be movably coupled to the outer ecliptic ring 24. The plurality of planets 44a, 44b and 44c are visualized by a viewer from the Earth 16 as a plurality of stars. For illustrative purposes, at least one star 46a and at least one galaxy 46b may be visualized in the geocentric module 10 by movably or fixedly coupling the star 46a and the galaxy 46b to the framework created by the celestial equator 18 and the meridians 20. Additionally, at least one constellation 46c, such as the Big Dipper, may be coupled to the meridians 20. A wire may be bent into the shape of the constellation of interest, and the wire ends may be bent around the meridians or latitudes of the sphere. Additional stars, galaxies, and constellations may be coupled to the meridians 20 and the celestial equator 18.

Figure 9:
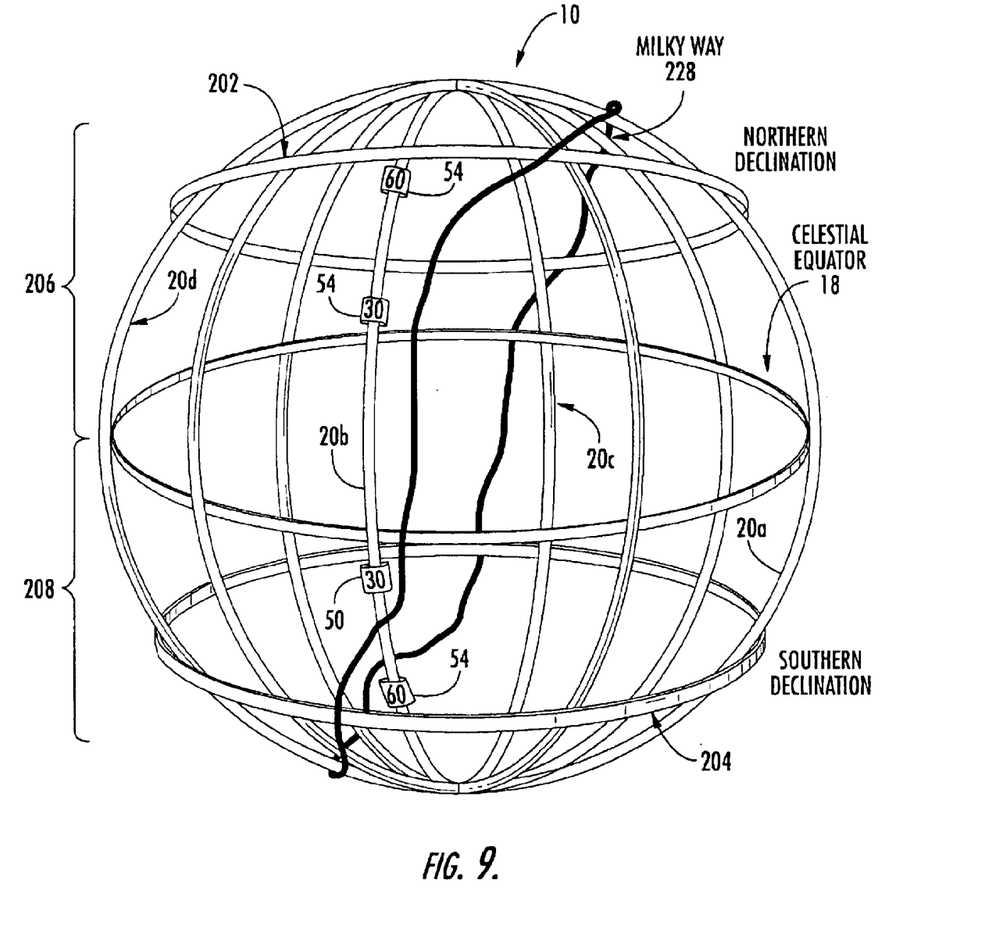
FIG. 9 is substantially a front elevated view of the geocentric module showing an embodiment with two rings of declination.

In other embodiments, heavenly bodies, such as stars, planets, constellations, and galaxies, may be fixedly or removeably coupled to the inner ecliptic ring 22, the outer ecliptic ring 24, the celestial equator 18, the meridians 20, or rings of declination 202 or 204 (see FIG. 9). In one embodiment, the outer ecliptic ring 24, the celestial equator 18, the meridians 20, or the rings of declination 202 or 204 may have holes to accept pegs (not shown). The pegs can be located on pre-cut or pre-formed constellations. Removable stickers, "hook and loop" fasteners, such as VELCRO®, and other attachment devices and methods known in the art may be used in place of the peg-and-hole configuration.

With continued reference to FIGS. 1 and 2, the heliocentric module 12 may include the sun 18, the Earth 47, and the plurality of planets 48a, 48b, 48c, 48d and 48e, which correspond to Mercury, Venus, Mars, Jupiter and Saturn, respectively. The heliocentric module 12 may provide a relational tool that can be used to describe the plurality of planets 44a, 44b and 44c from the geocentric module 10. By way of example and not of limitation, the plurality of planets 44a, 44b and 44c from the geocentric module 10 may correspond the plurality of planets 48a, 48b, and 48c from the heliocentric module 12.

The Geocentric Module

Figure 3:
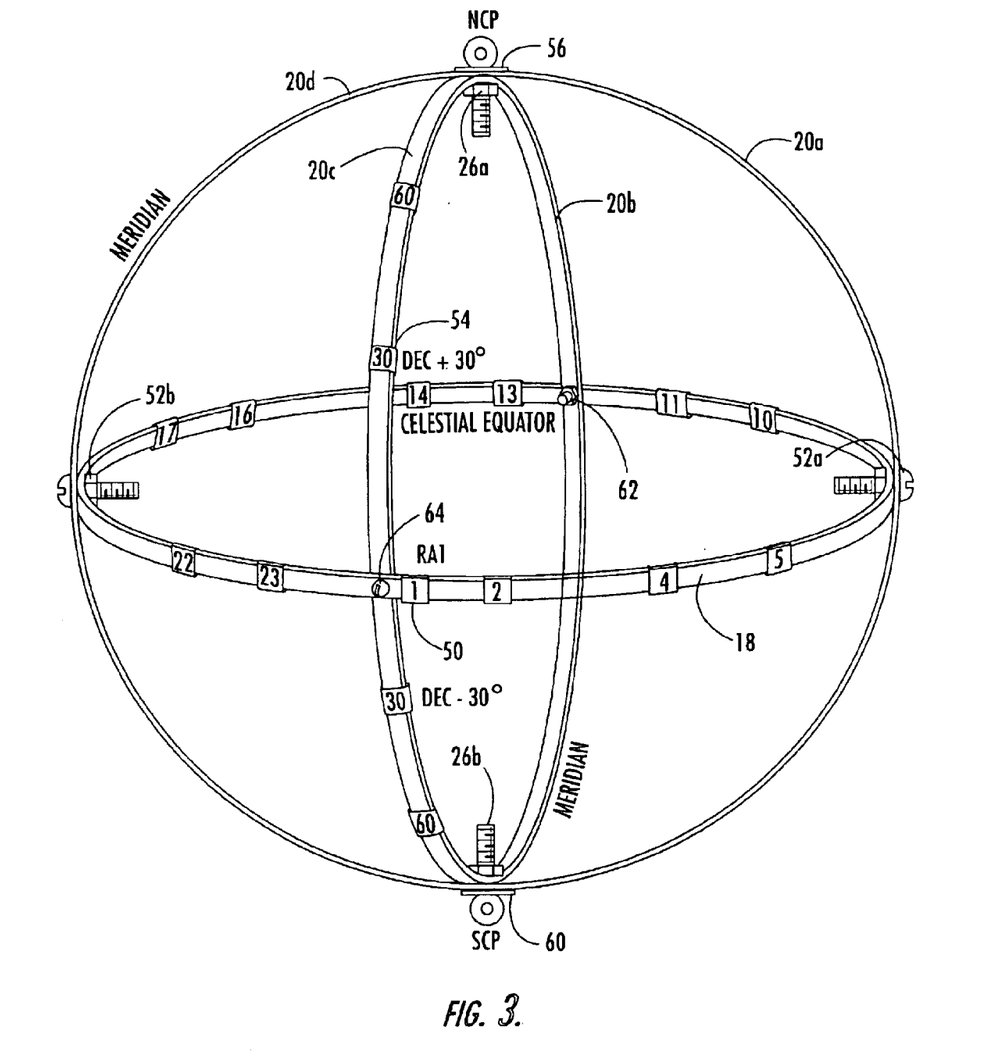
FIG. 3 is substantially a front elevational view of the geocentric module showing the celestial equator and a plurality of meridians, which may be part of the geocentric module.

Referring now to FIG. 3, there is shown the celestial equator 18 and four meridians. For illustrative purposes, only four meridians out of the eight meridians shown in FIG. 1 are discussed in FIG. 3. These four meridians are meridians 20a, 20b, 20c and 20d of FIG. 1. Preferably, the celestial equator 18 is imprinted with a plurality of numbers 50 having a plurality of integers from of one to twenty-four. The plurality of numbers 50 are preferably equally spaced along the celestial equator. The plurality of numbers 50 indicate the 24 hours of right ascension and correspond to the lines of longitude of the Earth. One hour of right ascension represents 15 degrees of the Earth's rotation and therefore in 24 hours the Earth rotates 360 degrees. It shall be appreciated by those skilled in the art that each hour of right ascension can be further divided into 60 minutes and each minute into 60 seconds. This is done to accurately locate the heavenly bodies in the geocentric module. In order to provide a cost effective astronomical model kit, the preferred astronomical model is preferably not designed to provide detail on the order of minutes or seconds. However, it shall be appreciated by those skilled in the art that higher tolerances can be achieved for the geocentric module 10. Preferably, the celestial equator 18 is fastened with two fasteners at locations 52a and 52b. The locations 52a and 52b are also the location for right ascension 6 and 18, respectively.

The meridians 20a, 20b, 20c and 20d are preferably labeled with a plurality of declination numbers 54. By way of example and not of limitation, the declination numbers 54 are at 30 degrees and 60 degrees with a positive declination representing portions of the Northern Hemisphere and a negative declination representing portions of the Southern Hemisphere. The declination numbers 54 correspond to the latitude of Earth. The meridians 20a, 20b, 20c, and 20d may be fixedly coupled to one another at the intersection of the meridians 56, which also defines the North Celestial Pole (NCP). Additionally at the intersection of the meridians 56, the meridians may also be fixedly coupled together with a fastener 26a (see FIG. 1). The meridians 20a, 20b, 20c and 20d may be fixedly coupled at the intersection of the meridians 60, which defines the South Celestial Pole (SCP). At the South Celestial Pole, the meridians may be fixedly coupled with a fastener 26b (see FIG. 1).

The meridians 20a, 20b, 20c and 20d may also be fixedly coupled to the celestial equator 18. The meridian 20a is preferably fixedly coupled to the celestial equator 18 at the right ascension 6 that is indicated by reference number 52a. The meridian 20b is preferably fixedly coupled to the celestial equator 18 at the right ascension 12 that is indicated by reference number 62. The meridian 20c is fixedly coupled to the celestial equator at the right ascension 0 that is indicated by reference number 64. Right ascension 0 and 24 are essentially the same. Finally, the meridian 20d is fixedly coupled to the celestial equator 18 at the right ascension 18 that is indicated by reference number 52b. It shall be appreciated by those skilled in the art that the description of the meridians 20a, 20b, 20c and 20d is provided for illustrative purposes only. Any number of meridians may be coupled and labeled in a similar manner.

Figure 4:
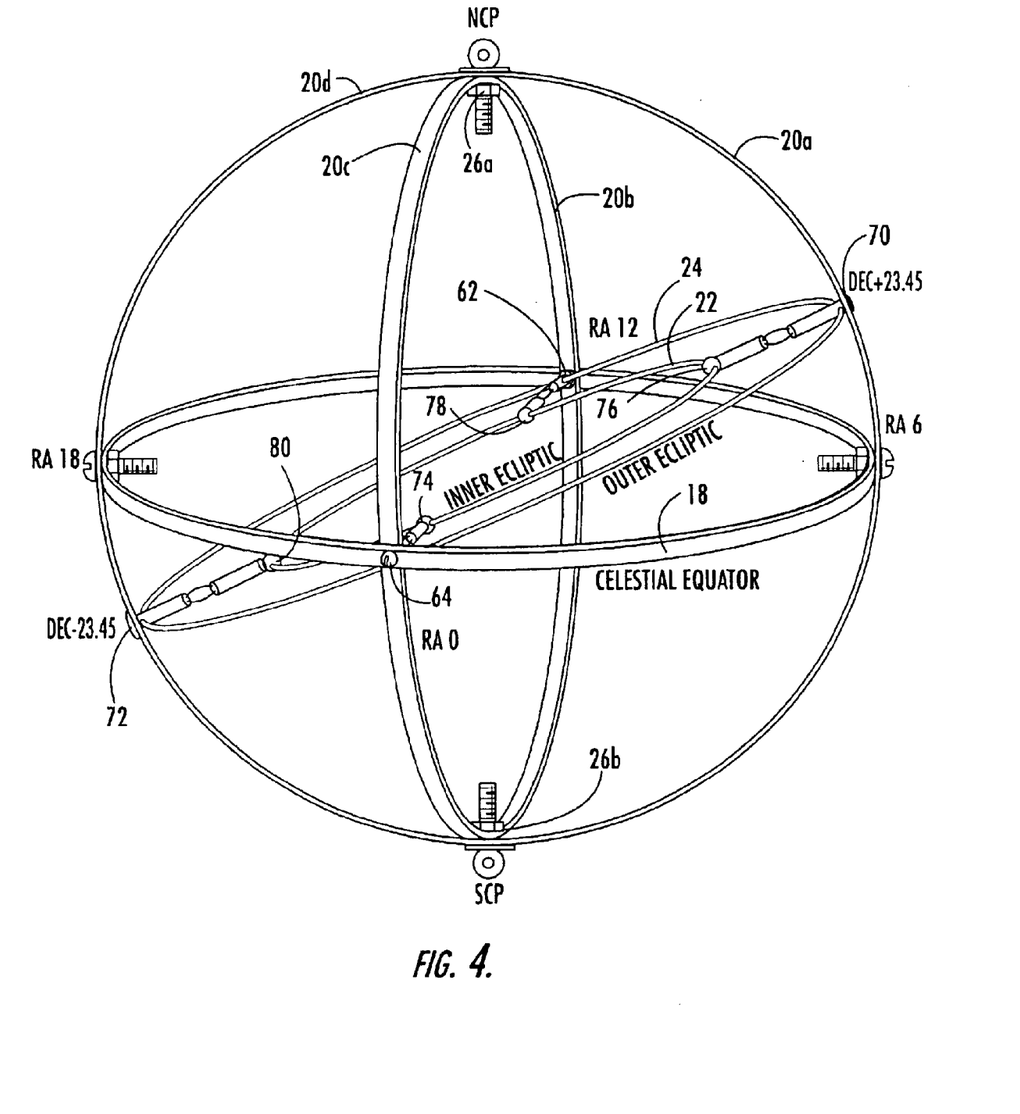
FIG. 4 is substantially a front elevational view of the geocentric module showing the celestial equator, a plurality of meridians, and ecliptic rings, which may be part of the geocentric module.

Referring to FIG. 4, there is shown an outer ecliptic ring 24, which may be fixedly coupled to the meridian 20a at an angle of +23.45 degrees from the celestial equator 18, which is the declination of the ecliptic and corresponds to reference number 70. Additionally, the outer ecliptic ring 24 is fixedly coupled to the meridian 20d at an angle of −23.45 degrees that corresponds to the declination of the ecliptic at reference number 72. Furthermore, the outer ecliptic ring 24 is fixedly coupled to the celestial equator at the right ascension 0 and 12 that correspond to intersections of meridian 20c and 20d, respectively, which occurs at reference numbers 64 and 62, respectively. The inner ecliptic ring 22 may be fixedly coupled to the outer ecliptic ring 24 at locations 74, 76, 78, and 80, which correspond to right ascension 0, 6, 12, and 18, respectively.

Preferably, the outer ecliptic ring 24 is labeled with the 12 zodiac constellations. By way of example, Pisces is located in the area defined by the right ascension 23 to right ascension 2. Preferably, the inner ecliptic ring 22 is labeled with all the twelve months of the year.

The Heliocentric Module

Figures 5, 7A, 7B, 7C, 7D:
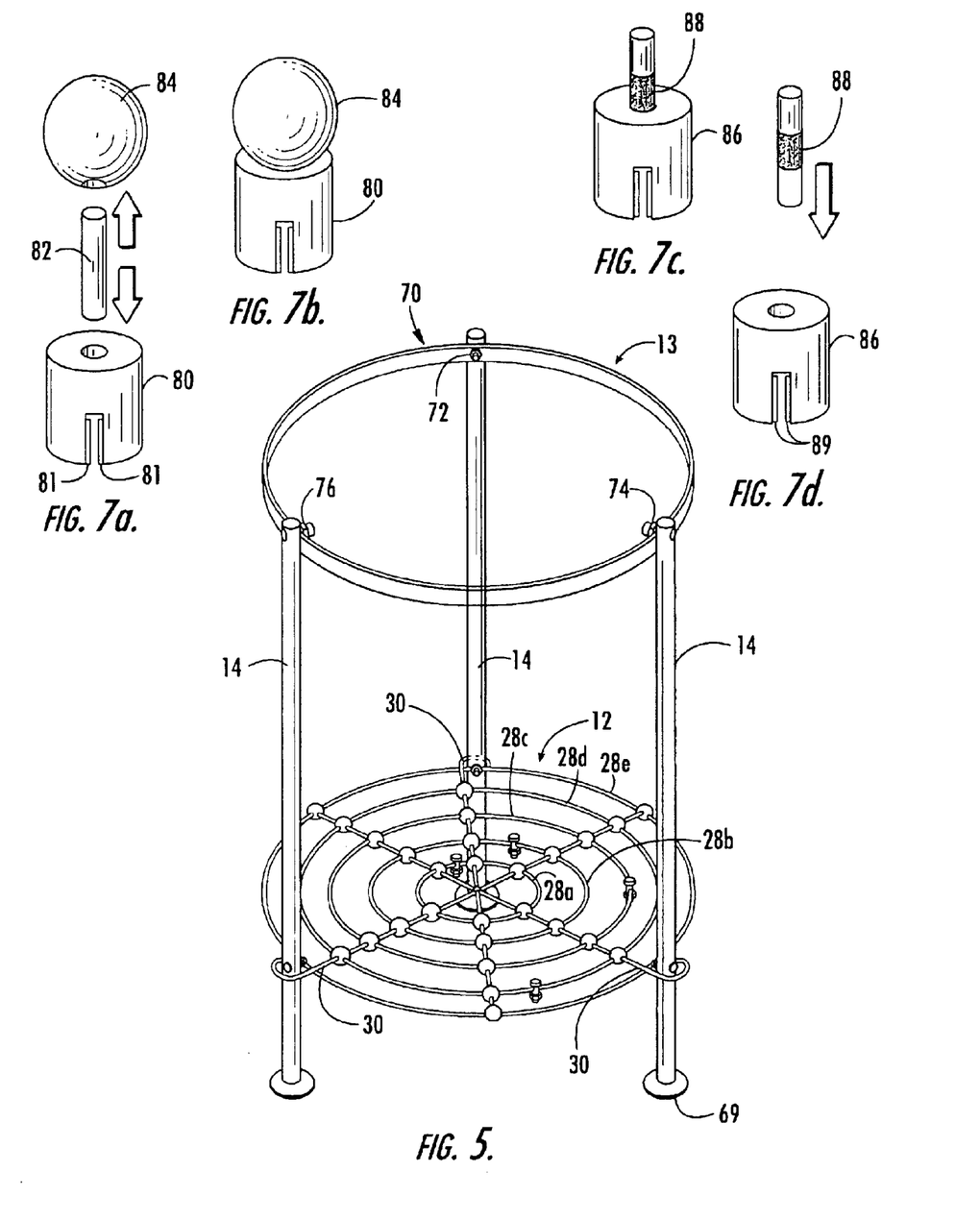

Referring to FIG. 5, there is shown a heliocentric module 12 without the sun 18 (seen in FIGS. 1 and 2). The heliocentric module 12 includes a plurality of wires 30 fixedly coupled to the each of the legs 14 of the housing 13. Additionally, each of the plurality of wires 30 provide support for a plurality of heliocentric rings 46a–f. Furthermore each of the plurality of wires 30 intersect in the location of where the sun 18 is located (see FIGS. 1 and 2).

The heliocentric module includes a plurality of heliocentric rings 46a–f (see FIGS. 1 and 2) that represents the orbits of the planets visible from Earth. More particularly, the plurality of heliocentric rings 46a–f correspond to the orbital paths of planets, such as Mercury, Venus, Earth, Mars, and Jupiter and Saturn, respectively. It shall be appreciated by those skilled in the art of astronomy, that Mercury, Venus, Mars, Jupiter and Saturn are readily visible from Earth. The planet Mercury travels along ring 28a. The planet Venus travels along ring 28b. Earth travels along ring 28c. The planet Mars travels along ring 28d. Jupiter and Saturn travel along ring 28e. Preferably, the ring 28e is labeled with the zodiac constellations, and ring 28c is labeled with the spring and fall equinoxes and the summer and winter solstice.

With continued reference to FIG. 5, the heliocentric module may be coupled to the housing 13, which includes a plurality of legs 14. Each of the plurality of legs 14 is fixedly coupled to a coaster 69. Additionally, each of the legs 14 are fixedly coupled to one another with a ring 70 using fasteners located at reference numbers 72, 74 and 76. The ring 70 receives the geocentric module 10. The housing 13 provides a housing that holds both the geocentric module 10 and heliocentric module 12 in one astronomical model kit (see FIG. 1). It shall be appreciated by those skilled in the art, that the term "housing" as used in this patent application includes a frame that holds both the geocentric module 10 and the heliocentric module 12 together. More generally, the term housing applies to any mechanical apparatus that performs the function of coupling the geocentric module 10 and heliocentric module 12 in a single astronomical model.

Assembly of Astronomical Model

Figure 6:
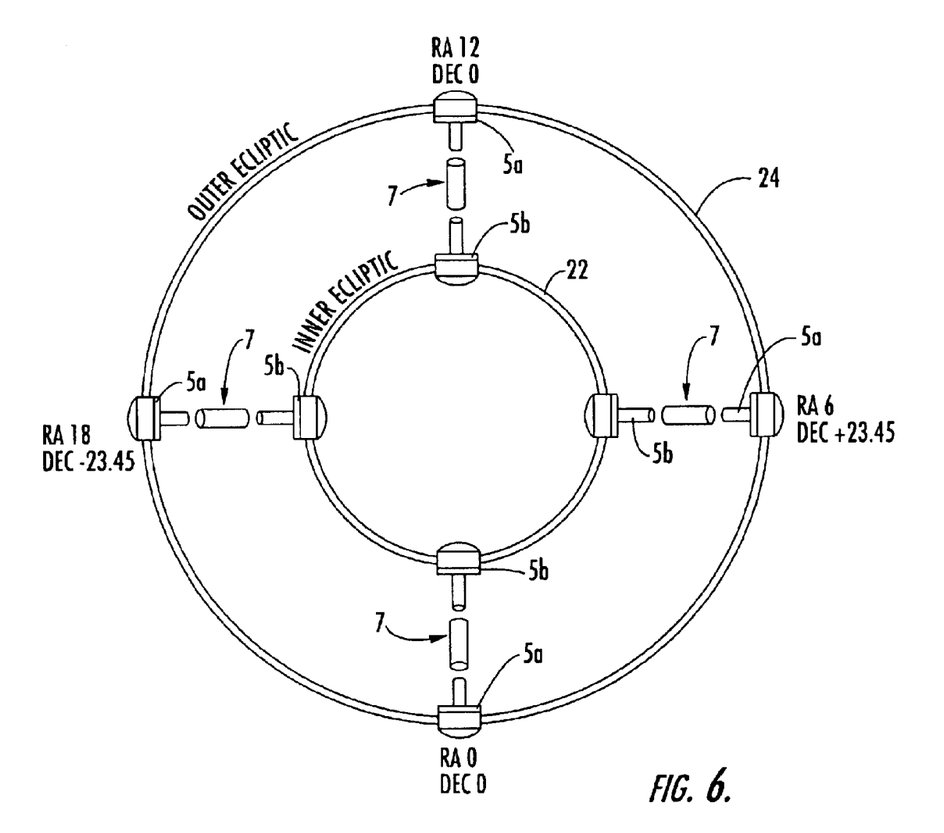
FIG. 6 is substantially an exploded view of the ecliptic rings shown in FIG. 4 including the fasteners used to couple the ecliptic rings.

Various embodiments of the astronomical model provide educational tools that may be cost effective to manufacture and may be simple to assemble. Preferably, assembly of the geocentric module 10 and heliocentric module 12 is provided with cost effective materials that allow easy assembly. The materials for the assembly of the astronomical models may include plastic strips for the rings and meridians, a plurality of fasteners, such as screws and nuts, heavy gauge wires for the constellations, and labels. Referring now to FIG. 6, a plurality of hollow wooden dowels 7 in combination with screws 5a and 5b may be used to operatively couple the inner ecliptic ring 22 with the outer ecliptic ring 24. A plurality of spherical objects may be used to represent the Sun 18 and 42, the Moon 40, Earth 16, other planets 48a–f, and stars (see FIGS. 1 and 2).

For the heliocentric module 12, a plurality of variously sized rods 30 may also be used as support for the orbits 28a–e (see FIGS. 1 and 2). By way of example and not of limitation, heavy gauge wire 46c may be used to represent the constellations, such as the Big Dipper, or even groupings of constellations such as the Summer Triangle (see FIG. 2).

Referring to FIG. 7a there is shown the components for the assembly of the sun 42 and moon 40 (see FIG. 2) resident on the geocentric module 10 or heliocentric module 12. The components preferably include a base 80, which has two pieces of felt 81 in the cavity at the bottom of the base 80, a rod 82 configured to be received in a cavity at the top of the base 80, and a sphere 84 having a cavity configured to receive the rod 82. FIG. 7b shows the assembly having a sphere 84 coupled to the base 80. The base 80 is preferably movably coupled to the inner ecliptic ring 22 and the outer ecliptic ring 24.

Referring to FIG. 7c and 7d, there is shown the components for the assembly of the planets and stars that may be movably coupled to the outer ecliptic ring 24, the meridians of the geocentric module 10, the celestial equator 18, or the rings of declination 202 or 204 (see FIG. 9). The planets and stars preferably include a base 86 and a rod 88. The base 86 preferably includes a cavity for receiving the rod 88 at the top of the base 86 and two pieces of felt 89 in the cavity at the bottom of the base 86. The rod 88 preferably includes a silvered tip located at the top of the rod 88 and a blackened intermediate portion of the rod 88. At the bottom of rod 88 is preferably an uncolored portion, which is received by the base 86. FIG. 7d shows the assembly preferably having a rod 88 with a silvered tip and a base 86. The base 86 is preferably movably coupled to the outer ecliptic ring 24, the celestial equator 18, and the meridians 20.

Method of Generating Astronomical Model

Figure 8:
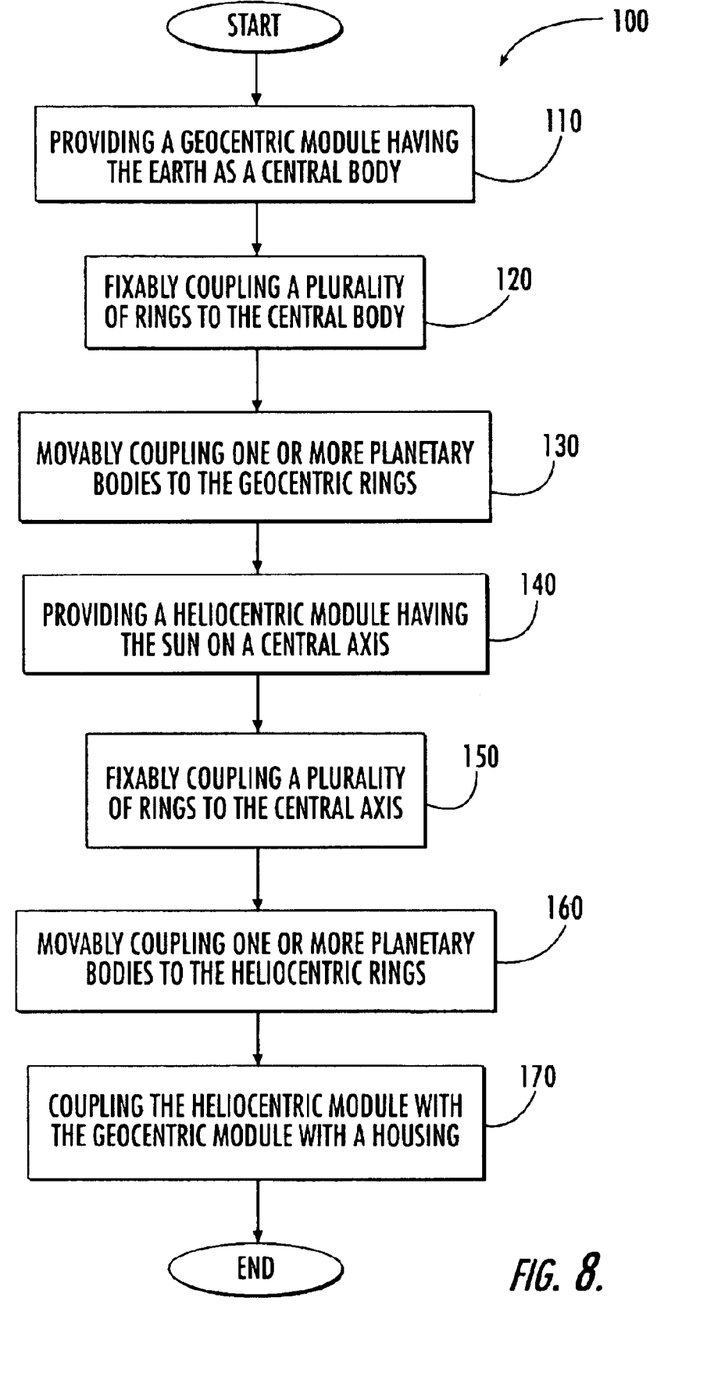
FIG. 8 is substantially a flowchart of a method for generating an astronomical model having a geocentric module and a heliocentric module on a shared housing.

FIG. 8 is a flowchart of a method for generating an interactive astronomical model 100. Referring to FIGS. 1 and 8, the method comprises block 110, which provides a geocentric module 10 having a central body configured to represent Earth 16. The geocentric module 10 provides one element of the astronomical model kit. Preferably, the geocentric module 10 is easily assembled by the user. The method then proceeds to block 120.

At block 120 the method includes coupling a plurality of geocentric rings to each other around the central body of the geocentric module 10, which is Earth 16. Preferably, the rings include a plurality of meridians 20, a celestial equator ring 18, an outer ecliptic ring 24, and an inner ecliptic ring 22. The rings and meridians may be fixedly coupled with fasteners as described above. The method then proceeds to block 130.

At block 130 the method includes movably coupling one or more planetary bodies to the rings or meridians of the geocentric module. Referring to FIGS. 2 and 8, the planetary bodies may include the sun 42, the moon 40, a plurality of planets 44a through 44b within the solar system, a plurality of stars, and galaxies, such as 46a and 46b. Constellations 46c may also be coupled to the geocentric module 10. The method then proceeds to block 140.

At block 140, a heliocentric module 12 is preferably provided as having a central axis, which defines the location of the sun 18. The heliocentric module 12 provides a relational tool for comparing the events in the geocentric module 10 to the events in the heliocentric module 12. The method then proceeds to block 150.

At block 150, a plurality of rings may be fixedly coupled to the central axis of the heliocentric module 12. The plurality of rings 28a through 28e may define the orbital paths of the five planets readily visible from Earth. These planets may include Mercury, Venus, Mars, Jupiter and Saturn. A more detailed description of the coupling of the rings is provided above. The method then proceeds to block 160.

At block 160, one or more planetary bodies may be movably coupled to the heliocentric module 12. Using an astronomical chart, the user can establish the location of each of the planets having orbital paths defined by the rings 28a through 28e. For purposes of simplicity and due to the length of travel needed to complete a single revolution, the planets Jupiter and Saturn travel along the ring 28e. The method then proceeds to block 170.

At block 170, the heliocentric module 12 and the geocentric module 10 are coupled to one another with a housing 13. As previously described the housing 13 is preferably a stand, which is configured to receive the geocentric module 10. The planets in the heliocentric module 12 provides the user with a visual correlation to the planets viewed on the geocentric module 10. Preferably, a two dimensional astronomical map is used to properly map the heavenly bodies associated with the heliocentric module 12 and the geocentric module 10. By way of example and not of limitation, after the mapping is completed a comparison between the planets in the heliocentric module 12 and geocentric module 10 provides the viewer with a three-dimensional perspective that is not available in the two-dimensional astronomical map.

It shall be appreciated by those skilled in the art having the benefit of this disclosure that the steps for generating the interactive astronomical model do not have to be accomplished in the order described. By way of example and not of limitation, the rings and meridians may be fixedly coupled in the geocentric module 10, before the Earth component is added to the geocentric module.

Operation of Astronomical Model

The operation of the astronomical model 8 may be viewed by referring to FIG. 2. In operation, the sun 42 revolves eastward around the Earth 16 on the outer ecliptic ring 24. The moon 40 revolves eastward around the Earth 16 on the inner ecliptic ring 22.

The astronomical model 8 provides a three-dimensional visual model of how an eclipse occurs. A solar eclipse may be demonstrated with the geocentric module 10 by placing the moon 40 between the Earth 16 and the sun 42, thereby blocking out sunlight to certain areas of the Earth 16. A lunar eclipse may be demonstrated by placing the moon 40 on the side of the Earth 16 opposite the sun 42, which will cause the Earth 16 to block the sunlight from reaching the moon 40.

As previously described, the outer ecliptic ring 24 may be divided into 12 segments according to the zodiac constellations (not shown). The word zodiac means circle of animals and most of the twelve zodiac constellations are animals. The sun 42 makes one revolution around the outer ecliptic ring 24 in 12 months. The sun 42 spends about one month in each of the zodiac constellations. When the sun 42 is in one of these regions of the sky, the constellation itself cannot be viewed from the Earth 16 because bright sunlight blocks the view of the constellation. During nighttime viewing, the zodiac constellation, which are six months removed from the daytime constellations are visible. For example, the sun is in Sagittarius during winter. At night around nine o'clock you will see Gemini. It shall be appreciated by those skilled in the art that the dates for each of the zodiac constellations represent when the sun is in that constellation, not when that constellation is viewed in the evening sky.

The celestial equator 18 represents the outward extension the Earth's equator. The Earth's equator is perpendicular to its axis of rotation, which passes through its geographic North Pole 26a and South Pole 26b. Extending the Earth's axis of rotation establishes the north celestial pole (NCP) 26a (see FIG. 1) and the south celestial pole (SCP) 26b (see FIG. 2). The NCP and the SCP are each 90 degrees from the celestial equator 18.

The celestial equator 18 forms an angle of 23.45 degrees with the ecliptic rings 22 and 24. As the Earth 16, with its titled axis of rotation, revolves around the sun 42 of the ecliptic plane 25, seasonal variations in climate occur. During the winter solstice, the Northern Hemisphere is tilted farthest away from the ecliptic. During the summer solstice, the Northern Hemisphere is tilted toward the sun and summer occurs.

At the equinoxes 31 the Earth's axis points neither toward nor away from the sun 42. These two points are found on the celestial sphere where the outer ecliptic ring 24 crosses the celestial equator 18 (see FIG. 1). The spring or vernal equinox occurs in the Northern Hemisphere when the sun 42 is ascending toward the summer solstice 27. The fall or autumn equinox occurs when the sun 42 is traveling downward along the outer ecliptic ring 24 toward the winter solstice 29. Equinox means equal day and night and occurs at these two points 31.

The concept of precession of the equinoxes is difficult to visualize, but can be demonstrated with the geocentric module 10. As the Earth spins on its axis, it also precesses in a circle like a spinning top. The Earth's North Pole projects along the Earth's axis of rotation to the NCP, and likewise, the Earth's South Pole projects to the SCP. As the Earth precesses, its axis of rotation will draw a circle that delineates the changing position of the NCP and the SCP. A nearly complete circle is drawn about every 26 thousand years. This mean that our North Star will not always be Polaris. In 10 thousand years it will be Vega. While the NCP and SCP change as the Earth precesses, so do the equinoxes and solstices. Just as the Earth' axis of rotation changes its direction, the projection of the Earth's equator to the celestial sphere changes. The points change where the celestial equator intersects the ecliptic. Approximately every two thousand years the Spring Equinox will be located in a different zodiac constellation. In the year 2700 it will be in Aquarius instead of Pisces. The date remains about the same, March $20^{th}$, but the constellation changes.

Another way to visualize the concept of precession is to label the inner ecliptic circle 22 with the 12 months of the year (not shown). As viewed from the Northern Hemisphere 206, as the Earth 16 precessed clockwise, imagine the outer ecliptic ring 24, which is labeled with the zodiac constellations rotating slowly counter-clockwise. The equinox at March 20 will not change, but the location of the zodiac constellations will change, and Aquarius will gradually approach the spring equinox. Approximately, two thousand years after that, Capricorn will be at the spring equinox.

The geocentric module 10 can also be used to help visualize the phases of the moon 40 from new moon to full moon. These phases can be demonstrated in the geocentric module by painting portions of the moon 40 black and gray and by rotating the moon 40 on its axis. This is just a representation achieved by rotating the moon 40 clockwise. In actuality, the moon rotates in the same direction as it orbits the Earth, counter-clockwise.

The geocentric module 10 can also explain the different times that the moon 40 appears in the sky. By way of example and not of limitation, the moon 40 is placed at its first quarter position, which is one quarter of the way around the inner ecliptic 22, east of the sun 42. The user may then place their reference for a line of sight at the moon 40 and look towards the Earth 16. The Earth 16 is then slowly rotated counter-clockwise. From the Northern Hemisphere 206, the user is presented with the time of moonrise in the east. Typically, the moonrise is in its first quarter at about noontime. If the viewer continues viewing from the moon reference point and slowly rotates the Earth until a reference point on the Earth disappears, then this corresponds to the time of moonset in the west.

Another concept that may be taught with the geocentric module 10 is the concept of a horizon. By way of example, a person located at the Earth's North Pole cannot see the night time stars over the South Pole because the Earth blocks this view. The most a person can see from the North Pole are those stars north of the celestial equator 18. This is a 180-degree plane drawn tangentially through the observer's location, which defines the horizon.

The geocentric module 10 also provides an instructive tool which allows a person to study the heavens from the viewpoint of someone who lives in the Southern Hemisphere and where the Earth is seen to rotate clockwise, and the moon and the sun revolve around clockwise. Precession of the Earth's axis is counter-clockwise.

The geocentric module 10 can also help understand the analemma. The word comes from the Greek word meaning support or base. A vertical stand is used to mark the sun's shadow at noontime once or twice monthly through the year. A diagram can then be made of the sun's position throughout the year. This is used to help tell the correct time. The shape of the analemma resembles the figure of the number eight. The vertical, northern, and southern extent of the analemma may be determined by the angle the ecliptic plane 25 makes with celestial equator 18. In the Northern Hemisphere 206, the sun will be high in the sky in the summer, low in the sky in the winter, and at intermediate positions throughout the rest of the year.

The horizontal east-west position of the sun in forming the analemma is determined by two factors. The first factor relates to the fact that the Earth orbits the sun in an elliptical shape, and this causes the Earth to move faster when it is closer to the sun during the winter months. In the summer months, when the Earth is farthest from the sun, the sun moves at its slowest velocity eastward through the heavens.

The second factor that affects the horizontal spread of the analemma is the degree of tilt of the ecliptic plane 25. If one places the geocentric module 10 upright so that the celestial equator 18 is parallel to a floor, one sees that the ecliptic plane 25 has a greater slant at the equinoxes 31 than at the solstices 27 and 29. As the sun 42, travels along the outer ecliptic ring 24, the sun 42 will cover less territory within the same time period in the horizontal east-west direction at the equinoxes 31 than at the solstices 27 and 29. When the sun 42 travels on a more slanted course, some of its motion is in the vertical north-south direction, and the sun 42 will cover less territory in the horizontal east-west direction. These variations in the vertical and horizontal position of the sun throughout the year contribute to the figure eight that the analemma forms. Those of ordinary skill in the art shall appreciate that a host of astronomy treatises describe the analemma.

The geocentric module 10 also provides a three-dimensional model of the sun's movements across the sky. The most obvious movement viewed from Earth each day is the rising of the sun in the east and its movement westward to set in the west. The other less obvious movement of the sun is its yearly eastward progression caused by the Earth's orbit around the sun.

Another concept that may be visualized with the geocentric module 10 is concept of sidereal time, which is referred to as star time. It shall be appreciated by those skilled in the art that the Earth 16 averages one rotation every 24 hours in relation to the sun 42, which is a solar day; but it takes about four minutes less than this in relation to the stars, which is sidereal day. This concept is displayed in the geocentric module 10 by placing the sun 42 on the outer ecliptic ring 42 above Orion at RA 6 (see FIG. 4). The Earth 16 is then rotated once. Orion has not moved. However, the sun 42 has moved east about one degree, because in roughly 365 days the sun will make a complete revolution of 360 degrees.

The combination of the heliocentric module 12 and the geocentric module 10 provides for a relational representation of the visible planets in Earth's solar system. The five planets visible to the naked eye include Mercury, Venus, Mars, Jupiter and Saturn. The relational representation is provided by having a first reference point, which uses the Earth as the central body, and a second reference point, which uses the sun, and then housing the modules on the same astronomical kit for easy comparative analysis.

The heliocentric module 12 provides five rings 28a through 28e, which represent the orbits of the five visible planets and Earth. As previously described, Jupiter and Saturn occupy the same orbit with ring 28e. By way of example and not of limitation, Jupiter and Saturn will remain in the constellations Taurus and Aries throughout the year 2001. Venus will be seen in almost every zodiac constellation before the end of a 12-month period. It shall be appreciated by those skilled in the art that the five visible planets orbit very close to the angle of the outer ecliptic ring 24. An astronomical chart may be used to provide assistance in locating the planets in the geocentric module 10 and in the heliocentric module 12. It shall be appreciated by those skilled in the art that the planets in the geocentric module 10 may be linked to the inner ecliptic ring 22, the outer ecliptic ring 24, one of the meridians 20 or the celestial equator 18, or the rings of declination. It shall also be appreciated by those skilled in the art that the planets in the heliocentric module 12 may be movably coupled to rings 28a through 28e to visualize and compare with the planets in the geocentric module 10.

The heliocentric module 12 may be used to demonstrate the planetary heliocentric longitudes. The heliocentric longitude of a planet is the angle between the spring equinox and the planet. It may be measured counterclockwise from the spring equinox from the sun's viewpoint. Astronomical handbooks, such as the Observer's Handbook, published by the Royal Astronomical Society of Canada, list the planetary longitudes each year for each month of the year. The heliocentric module 12 may be used with the listing of planetary longitudes to correctly position planets in the heliocentric module 12 for a particular time of the year.

A user may also consult astronomical handbooks for the current coordinates of Right Ascension and Declination of the planets. The user may use the geocentric module 10 with the listing of current coordinates of Right Ascension and Declination to correctly place planets in the geocentric module 10. After the planets are placed in their correct locations in the heliocentric module 12 and geocentric module 10, the user may draw an imaginary line from the Earth 48c of the heliocentric module 12 towards any of the planets and note any labeled constellation the line intersects. The user may now realize that this constellation is the same as the constellation seen in the geocentric module 10.

Therefore, by knowing the positions of the planets in one of the modules, either by direct observation or astronomical charts, one can approximate where the planets belong in the other module and can determine which constellation the planet will be seen in from the Earth at any given time.

Rings of Declination

FIG. 9 shows an embodiment of the geocentric module 10 that includes rings of declination 202 and 204. The rings of declination 202 and 204 may be made from a hoop or individual struts. The rings of declination 202 and 204 may be attached to the meridians 20a, 20b, 20c, and 20d with fasteners known in the art, such as screws and nuts, and positioned substantially parallel to the celestial plane of the celestial equator. The rings of declination 202 and 204 are preferably positioned at varying heights relative to the celestial equator, which is at zero degrees of declination. At least one ring of declination 202 is preferably positioned around the Northern Celestial Hemisphere 206, and at least one ring of declination 204 is preferably positioned around the Southern Celestial Hemisphere 208. The number of rings of declination and their positions may vary and still fall within the scope of the invention.

It can be appreciated that the rings of declination 202 and 204 adds structural support to the geocentric module 10. The user may find it easier to identify the degree of declination with the rings of declination 202 and 204 than with a plain label 54 on a meridian. With the rings of declination 202 and 204, the user may also find it more feasible and convenient to attach heavenly bodies to the periphery of the geocentric module 10 than just having the meridians. For example, the rings of declination 202 and 204 provide an additional attachment for the Milky Way 228.

Horizon Apparatus

Figure 10:
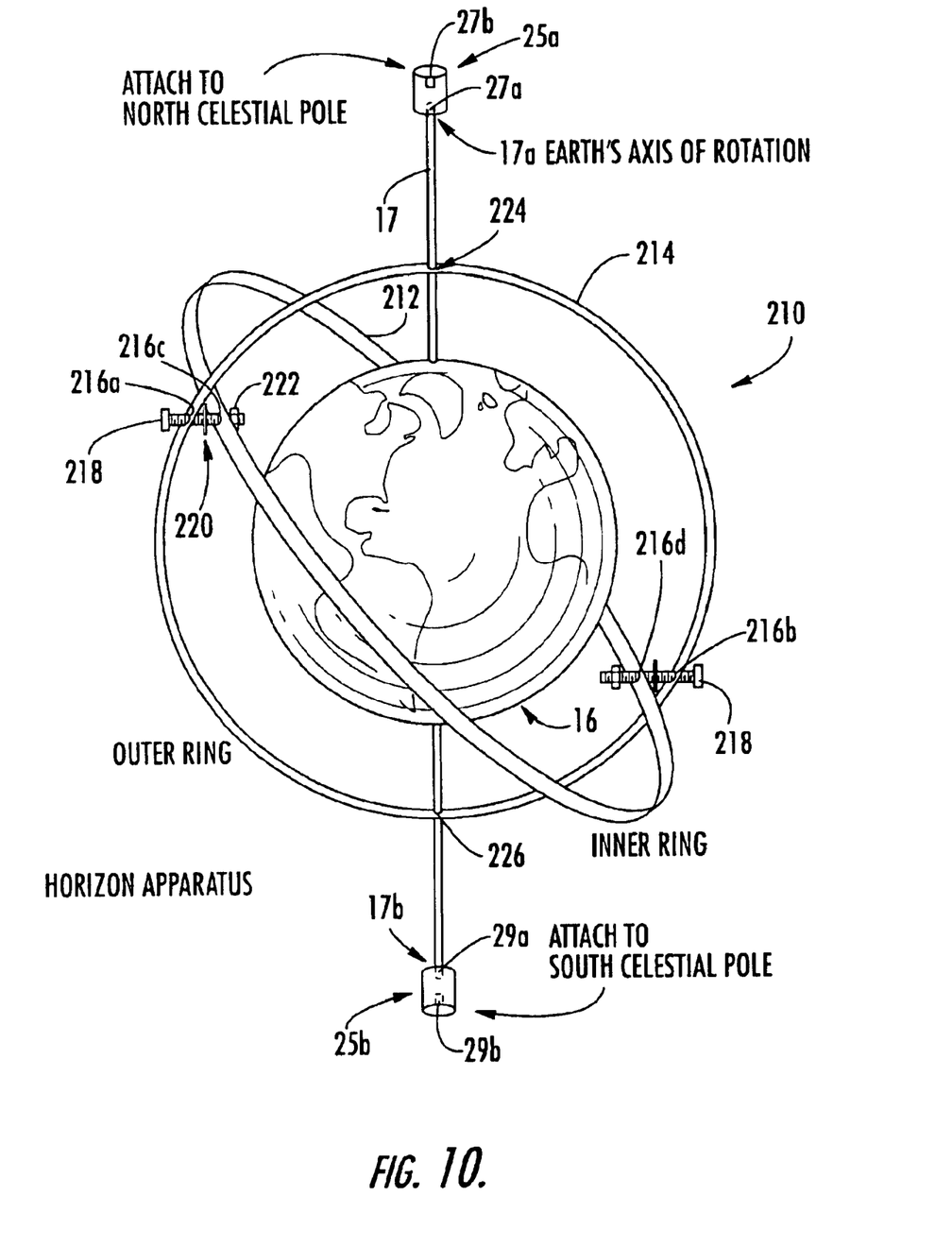
FIG. 10 is substantially a front elevated view of an embodiment of the geocentric module with an attached horizon apparatus.

FIG. 10 shows a horizon apparatus 210 that may be added to the geocentric module 10. The horizon apparatus 210 allows a person to conveniently visualize what can be seen in the sky from various locations on the Earth. In other words, the horizon apparatus 210 allows a user to visualize what is above the horizon from a viewpoint on the Earth. In a preferred embodiment, horizon apparatus 210 comprises a first ring 212 that is rotatably attached to a second ring 214. The first ring 212 is preferably positioned within the confines of the second ring 214. Thus, the first ring 212 may be referred to as the inner ring, and the second ring 214 may be referred to as the outer ring. The first ring 212 and the second ring 214 may be made of flexible materials, such as plastic hoops, which may be connected by fasteners known in the art.

In the preferred embodiment, the first ring 212 is preferably rotatable on an axis perpendicular to the Earth's axis of rotation. Each portion of the first ring 212 and the second ring 214 preferably has openings 216a, 216b, 216c, and 216d to accommodate a screw 218. The screw 218 goes through the first ring 212, a washer 220, and the second ring 214, and the screw end adjacent to the second ring 214 receives a nut 222. The second ring 214 is preferably rotatable on an axis parallel to the Earth's axis of rotation. The second ring 214 preferably has rod passages 224 and 226 at the north end and the south end of the second ring 214, respectively, to allow the second ring 214 to rotate on its axis of rotation. Rod passages 224 and 226 are preferably sized to provide a snug fit between the second ring 214 and the rod 17.

For a horizon apparatus user to visualize what is above the horizon from a selected location on the Earth, the user may rotate and position the outer ring 214 so that a specific location on earth lies at least approximately midway between the right and left edges (east and west edges) of the outer ring 214. By positioning the outer ring 214, the user delineates the eastern and western limits of the horizon. The user may then rotate and position inner ring 212 so that the specific location on earth lies at least approximately midway between the upper and lower edges (north and south edges) of the inner ring 212. Next, the user may mentally extend the plane defined by the inner ring 212 outward from Earth to visualize what can be seen in the sky.

Horizon apparatus 210 may also be used to demonstrate the approximate angle of the rising and setting of heavenly bodies at any latitude or longitude on Earth at various times of the year. For instance, horizon apparatus 210 may be used to show the difference in the angle of rising of the waning moon compared to the angle of setting of the waxing moon in springtime. The user may visualize the horizon rings without the Earth being present in the center. The user may then orient the apparatus such that an axis of rotation of the inner ring, defined by screws 218, which connect inner ring 212 to outer ring 214, is in line with the spring and fall equinox. Referring to FIG. 1, spring and fall equinox can be seen where the ecliptic ring 24 intersects the celestial equator 18. The user may select a location on Earth and rotate and position the outer ring 214 so that this location lies at least approximately midway between the east and west edges of the outer ring 214. The user may then rotate and position inner ring 212 so that the location lies at least approximately midway between the north and south edges of inner ring 212. The user rotates the Earth to simulate moonrise of the old moon and moonset of the new moon. The user also observes the angle of intersection between the horizon plane and the ecliptic plane. The user should observe that, in spring, the angle of moon rise of the old moon is substantially less than the angle of the moonset of the new moon. The angle of intersection between the horizon plane and the ecliptic plane is also steeper in summer than in spring.

The horizon rings may used to demonstrate the approximate angle of the rising and setting of Venus at any latitude or longitude on Earth at various times of the year. The user may position Venus in Aries. The user then selects one location on Earth to observe the horizon from the selected location, for example, 40N. The user also observes the horizon from the equator. The user may notice that at the equator, the horizon passes through the north and south poles. As the Earth rotates, the equator's horizon plane will meet Venus at a much steeper angle than the horizon plane for 40N. The user will also notice that Venus will rise more vertically at the equator than at 40N.

The horizon rings further help demonstrate the changing orientation of the moon's terminator. The moon may be divided into illuminated and non-illuminated portions. The line of demarcation between the illuminated and non-illuminated portions may be referred to as the terminator. The horizon rings may show that the orientation of the terminator changes depending on the moon's location with respect to the horizon. To further illustrate, the user may place the moon on the inner ecliptic ring about two hours of right ascension to the east of the sun located on the outer ecliptic ring. The user rotates the moon on its base so that a young crescent is simulated. The young crescent's sharp horns will be pointing away from the sun. The user may rotate the Earth's axis counterclockwise as viewed from the north celestial poles to simulate moonrise. The user should notice that the crescent is pointing downward towards the horizon. It helps if the user imagines the inner horizon ring extending outward to intersect the periphery of the geocentric module. The user may rotate the Earth's axis counterclockwise and notice the crescent moon rising higher in the sky above the horizon plane. When it crosses the meridian, midway in its arc across the sky, the user will observe that the orientation of the terminator has changed such that the horns are pointing parallel to the horizon, or that the orientation of the terminator is perpendicular to the horizon. The user may continue rotating the Earth's axis counterclockwise and notice that the crescent moon is descending towards the horizon. At the point where it meets the horizon, which simulates moonset, the user will observe that the horns of the crescent will be pointing upwards, away from the horizon.

Milky Way

Referring to FIG. 9, in one embodiment of the present invention, Milky Way 228, which may comprise string, cord, cotton, or other material known in the art, may be attached to the sphere defined by meridians 20a, 20b, 20c, and 20d, celestial equator 18, and other rings of declination 202 and 204. Milky Way 228 may be fixedly attached or removeably attached to the meridians or rings of declination by of tying, glue, or attachment devices know in the art.

The astronomical model may be used to describe the Milky Way by using the heliocentric module 12. The components of the sun shown in FIG. 7a may be used and attached to the fourth heliocentric ring 28d. As discussed above, the fifth orbital ring 28e is preferably labeled with zodiac constellations. The sun may be removably attached to the fourth heliocentric ring 28d adjacent to Gemini on the fifth ring 28e. The sun now represents the entire solar system located towards the periphery of our galaxy orbiting about its center. The user may extend the line of sight from the sun through the central axis of the heliocentric module 12 and note that the line of sight intersects the outermost orbital ring in the constellation Sagittarius. Thus, when one looks at Sagittarius, one is looking towards the center of the Milky Way galaxy. When one looks towards Gemini, one is looking away from the center of our galaxy.

CONCLUSION

Although the description above contains many specifications, these should not be construed as limiting the scope of the invention but as merely providing illustrations of some of presently preferred embodiments of this invention. For example, the various components described above may be attached in various ways, such as fixedly, rotatably, movably, or removably. Thus, the scope of the invention should be determined by the appended claims and their legal equivalents rather than by the examples given.

What is claimed is:

1. A method of demonstrating an astronomical concept comprising:
   providing an astronomical model having at least an operating position, the astronomical model comprising a first ring, the first ring being configured to form an outer ring representing an outer ecliptic ring;
   positioning a second ring substantially within the confines of the first ring, the second ring forming an inner ring representing an inner ecliptic ring;
   coupling the outer and the inner ecliptic rings;
   positioning the outer and the inner ecliptic rings so that both rings define a common ecliptic plane while the astronomical model is in the operating position; and
   providing a sphere substantially within the confines of the second ring, the sphere being configured to represent a planet Earth, wherein the outer and the inner ecliptic rings serve as orbits for heavenly bodies.

2. The method of claim 1, further comprising:
   coupling at least a first object to the outer ecliptic ring or the inner ecliptic ring, the first object being configured to represent a moon;
   coupling at least a second object to whichever of the inner ecliptic ring and the outer ecliptic ring to which the first object is not attached, the second object being configured to represent a sun; and
   positioning the moon in between the Earth and the sun to demonstrate a solar eclipse.

3. The method of claim 1, further comprising:
   coupling at least a first object to the outer ecliptic ring or the inner ecliptic ring, the first object being configured to represent a moon;
   coupling at least a second object to whichever of the inner ecliptic ring and the outer ecliptic ring to which the first object is not attached, the second object being configured to represent a sun; and
   positioning the Earth in between the moon and the sun to demonstrate a lunar eclipse.

4. The method of claim 1, further comprising:
   providing a third ring configured to represent a celestial equator, the celestial equator being configured to divide space around the Earth into Northern and Southern Celestial Hemispheres;
   positioning the ecliptic plane at an angle relative to the celestial equator, the ecliptic plane comprising a first and second portion, the first portion being a higher elevated portion than the second portion;
   coupling at least one object to the inner ecliptic ring or the outer ecliptic ring, the object being configured to represent a sun;
   moving the sun around the ecliptic ring to which it is attached between the first and second portions of the ecliptic plane to demonstrate a transition of seasons from the Northern Hemisphere or Southern Hemisphere.

5. The method of claim 1, further comprising:
   coupling at least one object to the inner ecliptic ring or the outer ecliptic ring, the object being configured to represent a sun;
   providing a third ring configured to represent a celestial equator, the celestial equator being configured to divide space around the Earth into Northern and Southern Celestial Hemispheres, the celestial equator defining an equatorial plane;
   rotatably coupling the Earth to a rod, the Earth being rotatable on its axis, the axis being substantially perpendicular to the equatorial plane; and
   demonstrating winter solstice by positioning the sun at a lowest point below the equatorial plane.

6. The method of claim 1, further comprising;
   providing a third ring configured to represent a celestial equator, the celestial equator being configured to divide space around the Earth into Northern and Southern Celestial Hemispheres, the celestial equator defining an equatorial plane;
   rotatably coupling the Earth to a rod, the Earth being rotatable on variable axes, the axes being substantially perpendicular to the equatorial plane;
   moveably coupling at least one object to the inner ecliptic ring or the outer ecliptic ring, the object being configured to represent a sun; and
   demonstrating summer solstice by positioning the sun at a highest point above the equatorial plane.

7. The method of claim 1, further comprising:

coupling at least a first object to the inner ecliptic ring or the outer ecliptic ring, the first object being configured to represent a moon;

coupling at least a second object to whichever of the inner ecliptic ring and the outer ecliptic ring to which the sun is not attached, the second object being configured to represent a sun;

dividing the moon into at least two distinguishable portions; and moving the moon relative to the position of the sun to demonstrate at least one phase of the moon based on the appearance of the distinguishable portions of the moon.

8. The method of claim 1, further comprising:

providing a third ring configured to represent a celestial equator, the celestial equator being configured to divide space around the Earth into Northern and Southern Hemispheres;

positioning the ecliptic plane at an angle relative to the celestial equator;

coupling at least one object to the inner ecliptic ring or the outer ecliptic ring, the object being configured to represent a sun;

coupling the Earth to a rod, the Earth being rotatable on an axis; and demonstrating analemma based on positions of a moving sun relative to a rotating Earth.

9. The method of claim 1, further comprising:

coupling at least one object to the inner ecliptic ring or the outer ecliptic ring, the object being configured to represent a sun;

rotating the Earth on its axis to demonstrate sunrise and/or sunset.

10. The method of claim 1, further comprising:

defining a south pole and a north pole at ends of the Earth;

precessing the Earth; and visualizing changes in the position of the north pole and the south pole to teach concept of precession of equinoxes.

11. The method of claim 1, further comprising:

coupling an object to the inner ecliptic ring, the object being configured to represent a moon; and rotating the Earth, wherein a user may visualize concept of moonrise and/or moon set based on the rotation of the Earth relative to the moon.

12. The method of claim 1, further comprising:

coupling an object to the outer ecliptic ring, the object being configured to represent a sun;

placing an object in a fixed position relative to the Earth, the object being configured to represent a star;

rotating the Earth; and moving the sun on the outer ecliptic ring, wherein a user may understand the measurement of sidereal time.

13. A geocentric module kit, comprising:

a sphere configured to represent a planet Earth, the sphere being coupled to a rod, the rod having a north end and a south end, the rod configured to define a rotational axis which is perpendicular to an equator associated with the sphere;

at least one meridian configured to be coupled at or proximate to the north end and the south end;

a first fastener configured to fasten the north end of the rod with the meridian;

a second fastener configured to fasten the south end of the rod with the meridian; and a celestial equatorial ring configured to be coupled to the meridian;

an outer ecliptic ring configured to be coupled to the meridian; and an inner ecliptic ring configured to be coupled to the outer ecliptic ring.

14. The geocentric module kit of claim 13, further comprising at least one ring, the ring being coupled to the meridian and substantially parallel to the celestial equator.

15. The geocentric module kit of claim 14 further comprising at least one heavenly body configured to be coupled to the ring that is parallel to the celestial equator.

16. The geocentric module kit of claim 13, further comprising a plurality of rings, the plurality of rings being coupled to the meridian at a varying altitude and substantially parallel to the celestial equator.

17. The geocentric module kit of claim 16 further comprising at least one heavenly body configured to be coupled to the plurality of rings that are parallel to the celestial equator.

18. The geocentric module kit of claim 16 wherein the inner ecliptic ring is configured to serve as a path of at least one heavenly body.

19. The geocentric module kit of claim 16 wherein the outer ecliptic ring is configured to serve as a path of at least one heavenly body.

20. The geocentric module kit of claim 16 further comprising an object configured to represent a Milky Way galaxy connected to the at least one meridian.

21. The geocentric module kit of claim 13 wherein the celestial equatorial ring is configured to be on a plane which is shared by the celestial equator associated with the sphere.

22. The geocentric module kit of claim 13 wherein the outer ecliptic ring and the inner ecliptic ring are approximately at an angle which simulates a 23.45 degree angle from the equatorial ring.

23. The geocentric module kit of claim 13 further comprising at least one heavenly body configured to be coupled to the meridian.

24. The geocentric module kit of claim 13 further comprising a sun configured to travel along the outer ecliptic ring.

25. The geocentric module kit of claim 13 further comprising a moon configured to travel along the inner ecliptic ring.

26. The geocentric module kit of claim 13 further comprising a heliocentric module coupled to a housing, the housing configured to receive the geocentric module kit.

27. The geocentric module kit of claim 13 further comprising at least one heavenly body configured to be coupled to the celestial equator.

28. The geocentric module kit of claim 13 further comprising at least one heavenly body configured to be coupled to outer ecliptic ring.

29. An astronomical model comprising:

a sphere representing a planet Earth, the sphere being associated with a celestial equator, the celestial equator being configured to divide heavens into a Southern Hemisphere and a Northern Hemisphere;

a plurality of meridians connected to the sphere representing the planet Earth;

at least one label affixed to at least one of the plurality of meridians, the label being configured to indicate an angle of declination; and at least one ring attached to the plurality of meridians, the ring in combination with the label being configured to allow a user to determine the angle of declination of a location on the Earth.

30. The astronomical model of claim 29, further comprising at least one heavenly body configured to be attached to the ring.

31. The astronomical model of claim 30, wherein the heavenly body is a constellation.

32. The astronomical model of claim 29, wherein the position of the ring on the plurality of meridians corresponds to the Southern Hemisphere of the heavens.

33. The astronomical model of claim 29, wherein the position of the ring on the plurality of meridians corresponds to the Northern Hemisphere of the heavens.

34. An astronomical model comprising:

a sphere configured to represent a planet Earth, the Earth having a north, south, east; and west portion, the sphere having a plurality of representations of places on the Earth, the sphere being coupled to a rod;

a second ring rotatably attached to the rod, wherein the second ring may rotate around an axis parallel to the rod, the second ring being configured to define a second plane delineating the east and the west portions of the Earth; and a first ring rotatably attached to the second ring, the first ring being rotatable on an axis perpendicular to the rod, the first ring configured to define a first plane delineating a horizon on the Earth, wherein the combination of the first and the second ring allows a user to visualize a horizon from a specific place on the Earth.

35. The astronomical model of claim 34, further comprising:

a third ring configured to represent an orbit for a sun and positioned to centrally surround the sphere representing the Earth; and an object coupled to the third ring, the object being configured to represent the sun, wherein the sphere is rotatably attached to the rod, the sphere being configured to rotate on an axis parallel to the rod, wherein the rotation of the sphere allows the user to visualize sunset and sunrise at any month of the year.

36. An astronomical model comprising:

a heliocentric module, the heliocentric module comprising a first object representing a sun and a set of rings coupled to the first object, the set of rings being configured to centrally surround the first object, the set of rings being further configured to represent a plurality of orbits for heavenly bodies; and a geocentric module coupled to the heliocentric module, the geocentric module comprising a sphere, the sphere being configured to be divisible into a plurality of sections, each of the sections being configured to represent a meridian, a rod rotatably coupled to the sphere and positioned substantially within the sphere, a second object attached to the rod, the second object being configured to represent a planet Earth, wherein a user may rotate the rod to simulate the Earth's rotation on its axis.

37. The astronomical model of claim 36 further comprising at least one third object, the third object being attachable to the geocentric module, the third object being configured to represent a heavenly body, wherein the user may position the heavenly body on the geocentric module according to its angle of declination and right ascension, and wherein the user may locate the heavenly body's position on the heliocentric module based on the constellation derived from the geocentric module.

38. The astronomical model of claim 36 further comprising at least one third object, the third object being configured to represent a heavenly body, the third object being attachable to the heliocentric module according to its heliocentric longitude, at least one ring from the set of rings of the heliocentric module being marked with at least one constellation, wherein the user may locate the planet's position on the geocentric module based on a constellation derived from the heliocentric module.

39. The astronomical model of claim 36 comprising a set of geocentric objects attachable to the geocentric module and configured to represent a particular heavenly body, a set of heliocentric objects attachable to the heliocentric module and configured to represent the same heavenly body as the geocentric objects, wherein a user may attach geocentric objects on the geocentric module and the heliocentric objects on the heliocentric module to relate how the heavenly bodies may be seen from the Earth and how the heavenly bodies may be seen from the sun.

* * * * *